United States Patent [19]
Murrell

[11] 3,900,045
[45] Aug. 19, 1975

[54] FULCRUM PRESSURE REGULATOR
[75] Inventor: Donald K. Murrell, Los Angeles, Calif.
[73] Assignee: Robertshaw Controls Company, Richmond, Va.
[22] Filed: Sept. 27, 1973
[21] Appl. No.: 401,489

[52] U.S. Cl. ... 137/505.38; 137/505.46; 137/505.47
[51] Int. Cl. ............................................. F16k 31/385
[58] Field of Search . 137/466, 505, 505.38, 505.46, 137/505.47, 505.41

[56] References Cited
UNITED STATES PATENTS

| 359,787 | 3/1887 | Hyams | 137/505.46 X |
|---|---|---|---|
| 360,890 | 4/1887 | Kieley | 137/466 |
| 3,393,701 | 7/1968 | Brown | 137/505.47 X |
| 3,474,822 | 10/1969 | Kuhn | 132/505.41 |
| 3,779,274 | 12/1973 | Kelly | 137/505.38 |

Primary Examiner—Harold W. Weakley
Attorney, Agent, or Firm—Anthony A. O'Brien

[57] ABSTRACT

A pressure regulator includes a casing having a diaphragm therein defining a pressure chamber communicating with an inlet and an outlet, a regulating valve disposed in the casing and operated by the diaphragm and a fulcrum engaging the diaphragm to define a control portion and a valve member operating portion having unequal areas exposed to pressure in the pressure chamber such that the diaphragm pivots about the fulcrum as pressure varies to move the valve member operating portion and thereby control the regulating valve to provide a constant regulated outlet pressure with varying inlet pressure and flow.

7 Claims, 6 Drawing Figures

FULCRUM PRESSURE REGULATOR

BACKGROUND OF THE INVENTION

1. Field of the Invention

The present invention pertains to pressure regulation and, more particularly, to a pressure regulator utilizing a diaphragm for maintaining outlet pressure substantially constant with varying inlet pressure and flow.

2. Description of the Prior Art

Pressure regulators are conventionally used to regulate the pressure of fuel flow supplied to burner apparatus of appliances at a predetermined level in accordance with the capacity of such burner apparatus as well as in various other fields where a fluid is desired to be supplied at a substantially constant pressure. Such pressure regulators normally are operated by means of a pressure differential established on opposite sides of a diaphragm, the pressure differential displacing the diaphragm and a valve member carried thereby or integrally formed with the diaphragm such that movement of the valve member in cooperation with a valve seat regulates pressure at an outlet. The travel of the valve member carried by the diaphragm is equal to diaphragm displacement, and the amount of force operating the regulating valve is determined by the area of the diaphragm sensing outlet pressure. While such pressure regulators have been successfully used in systems for supplying fuel to burner apparatus, the size of the regulating diaphragm is required to be relatively large in order to provide proper valve movement for pressure regulation; and, accordingly, pressure regulators and control devices utilizing such pressure regulators have been relatively large.

SUMMARY OF THE INVENTION

The present invention is generally summarized in a pressure regulator including a casing having an inlet and an outlet; a diaphragm mounted in the casing to define a pressure chamber communicating with the inlet and the outlet; a regulating valve disposed in the casing and including a valve seat and a valve member movable by the diaphragm to cooperate with the valve seat to control flow in the casing; and a fulcrum engaging the diaphragm to define first and second unequal areas of the diaphragm exposed to pressure in the pressure chamber whereby the diaphragm pivots about the fulcrum as pressure in the pressure chamber varies to move the valve member relative to the valve seat and regulate pressure at the outlet.

Accordingly, it is a basic object of the present invention to utilize pressure acting on unequal diaphragm areas to operate a regulating valve to regulate pressure.

A further object of the present invention is to engage a diaphragm in a pressure regulator with a fulcrum to define unequal areas of the diaphragm exposed to pressure in a chamber such that the diaphragm will pivot about the fulcrum in accordance with the difference in diaphragm areas to provide pressure regulation by controlling a regulating valve in accordance with pivotal movement of the diaphragm.

The present invention has an additional object in maintaining outlet pressure from a casing relatively constant with varying inlet pressure and flow while utilizing a diaphragm of minimal size subjected to varying pressure on only one side.

Yet another object of the present invention is to operate a pressure regulator by means of a combination of the pressure differential across a diaphragm and a force differential created by outlet pressure acting on unequal areas of the diaphragm, the unequal areas being defined by the position of a fulcrum about which the diaphragm tends to rotate or pivot due to a torque moment resulting from the unequal forces on the unequal areas of the diaphragm.

Some of the advantages of the pressure regulator of the present invention over the prior art are that the size of the diaphragm is kept at a minimum, the travel of the regulating or inlet valve member is less than the movement of the larger area of the diaphragm due to the off-center position of the fulcrum, and the pressure regulator is of simple construction and can be easily adjusted to vary regulated outlet pressure.

DESCRIPTION OF THE PREFERRED EMBODIMENTS

Figure 2:
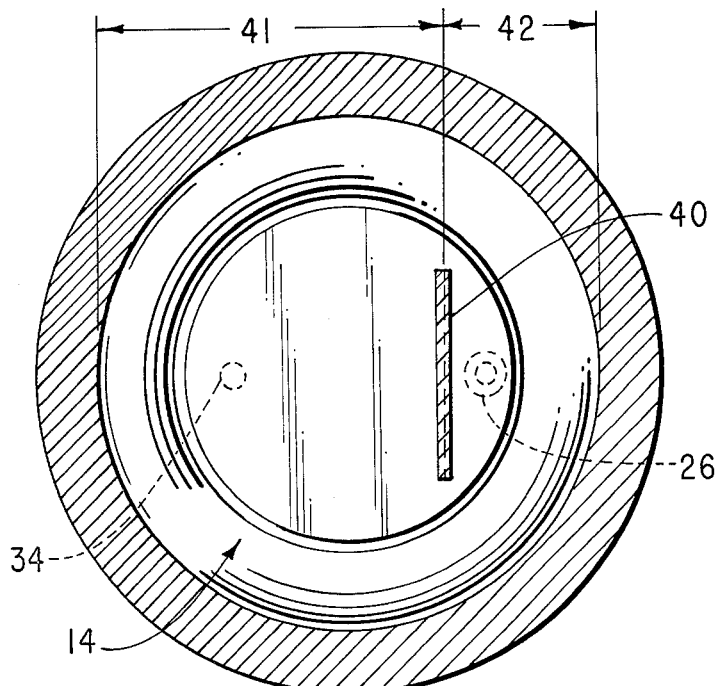
FIG. 2 is a section taken along line 2—2 of the pressure regulator of FIG. 1.
Figure 1:
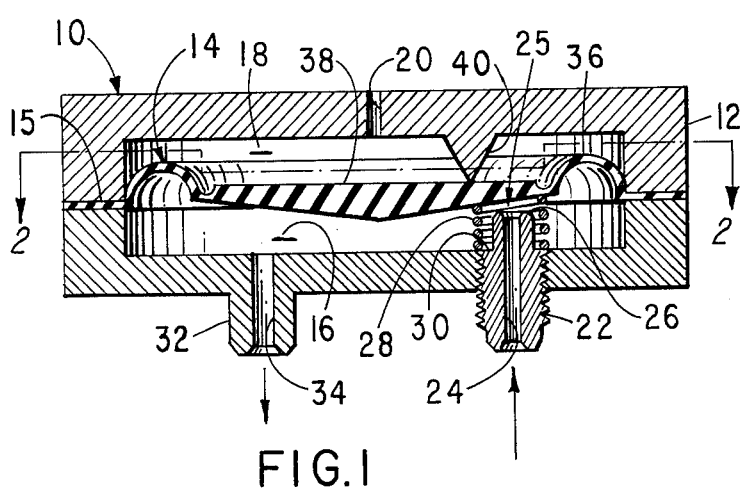
FIG. 1 is a vertical section of a pressure regulator according to the present invention.

A pressure regulator 10 according to the present invention is illustrated in FIGS. 1 and 2 and includes a casing 12 having a circular configuration and a diaphragm 14 having a marginal edge 15 clamped with a fluid-tight seal between opposite halves of the casing 12 to define a pressure chamber 16 and an atmospheric chamber 18, the chamber 18 communicating with the atmosphere through a vent 20. Casing 12 has an inlet fitting 22 threadedly engaging a wall thereof to permit communication between an inlet bore 24 in the fitting and pressure chamber 16. A regulating valve 25 is disposed in casing 12 and includes an annular valve seat 26 formed on the internal end of fitting 22, and a coiled spring 28 is mounted in compression between a shoulder 30 of the inlet fitting 22 and a portion of the diaphragm 14 defining a valve member for the regulating valve cooperating with the valve seat 26 to control flow in the casing 12. An outlet nipple 32 extends from the bottom wall of casing 12 to permit communication through an outlet bore 34 with pressure chamber 16 such that fluid flow from a source (not shown), such as a gas supply, can enter the casing 12 through inlet 24 and pass through the pressure chamber 16 to exit out of casing 12 through outlet 34.

The diaphragm 14 has an annular flexing rib 36 joining the marginal edge 15 and a circular, thickened central portion 38. A projection 40 depends from the top wall of casing 12 and includes converging surface portions that form at an elongate edge engaging the central portion 38 of diaphragm 14 at an off-center position to form a fulcrum about which the diaphragm rotates or pivots. The off-center positioning of the elongate fulcrum edge of projection 40, as illustrated in FIG. 2, defines unequal areas of the diaphragm 14 exposed to the pressure in chamber 16, the areas defining a control portion 41 between the fulcrum and the left-hand end of casing 12 and a valve member operating portion 42 between the fulcrum and the right-hand end of casing 12. The portion of valve member operating portion 42 aligned with valve seat 26 forms the valve member of regulating valve 25.

In operation, flow from the source to an appliance (not shown) passes through inlet 24, chamber 16 and outlet 34; and, as pressure increases in chamber 16 due to varying inlet pressure and/or flow, the pressure differential on opposite sides of diaphragm 14 in pressure chamber 16 and atmospheric chamber 18 pushes diaphragm 14 upward. Since the control portion 41 of the diaphragm 14 has more effective surface area than the valve member operating portion 42, the upward force on the control portion will be greater than the upward force on the valve member operating portion; and, thus, a torque moment is caused to pivot the diaphragm 14 clockwise about the fulcrum 40 thereby moving the valve member operating portion 41 of the diaphragm closer to the valve seat 26. The movement of the valve member closer to the valve seat restricts flow through the inlet 24 until the pressure in chamber 16 reaches a balance determined by the force exerted by coiled spring 28. The force from spring 28 is adjustable by rotation of inlet fitting 22 to thereby adjust the regulated outlet pressure.

When the pressure in chamber 16 decreases below the regulated outlet pressure due to varying inlet pressure and/or flow, the diaphragm 14 will rotate or pivot counterclockwise due to the pressure differential across the diaphragm, the unequal forces on control portion 41 and valve member operating portion 42 and the force from spring 28 thereby moving the valve member away from the valve seat 26 to increase flow into the chamber 16 until the regulated pressure balance is again obtained. Thus, the valve member operating portion 42 and the valve seat 26 cooperate to control the regulating valve 25 directly by pivotal movement of the diaphragm 14 about fulcrum 40.

Figure 3:
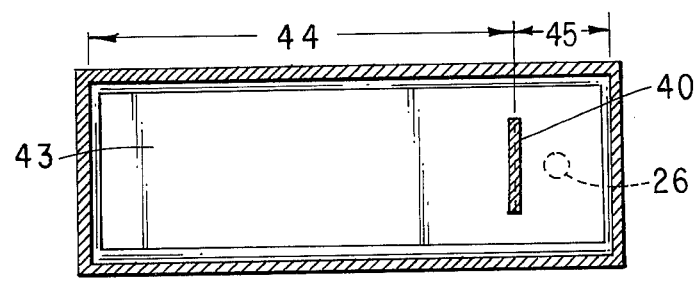
FIGS. 3 and 4 are broken top plan views of modifications of the pressure regulator of the present invention.
Figure 4:
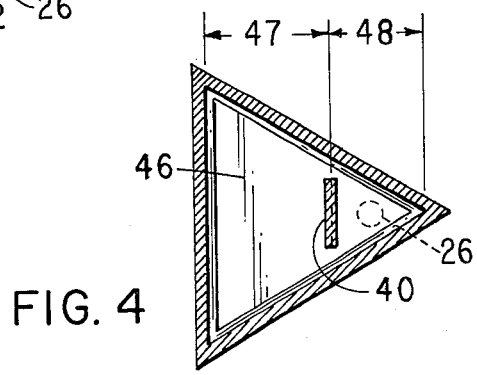

FIGS. 3 and 4 are broken top plan views of modifications of the presssure regulator of FIG. 1 utilizing rectangular and triangular casings, respectively. It being noted that the casing and diaphragm of the pressure regulator of the present invention can have any desired configuration providing unequal areas defined by a fulcrum to permit pivoting of the diaphragm about the fulcrum. In FIG. 3, the diaphragm is illustrated generally at 43, and the fulcrum 40 engages the diaphragm to form a control portion 44 of substantially greater area than a valve member operating portion 45 aligned with valve seat 26. Similarly, in FIG. 4, the diaphragm is indicated generally at 46 with the fulcrum 40 defining a control portion 47 of substantially greater area than a valve member operating portion 48 aligned with valve seat 26 and encompassing an apex portion of the triangularly configured diaphragm. The operation of the modifications of FIGS. 3 and 4 is substantially the same as that described above with respect to the pressure regulator of FIG. 1.

Figure 5:
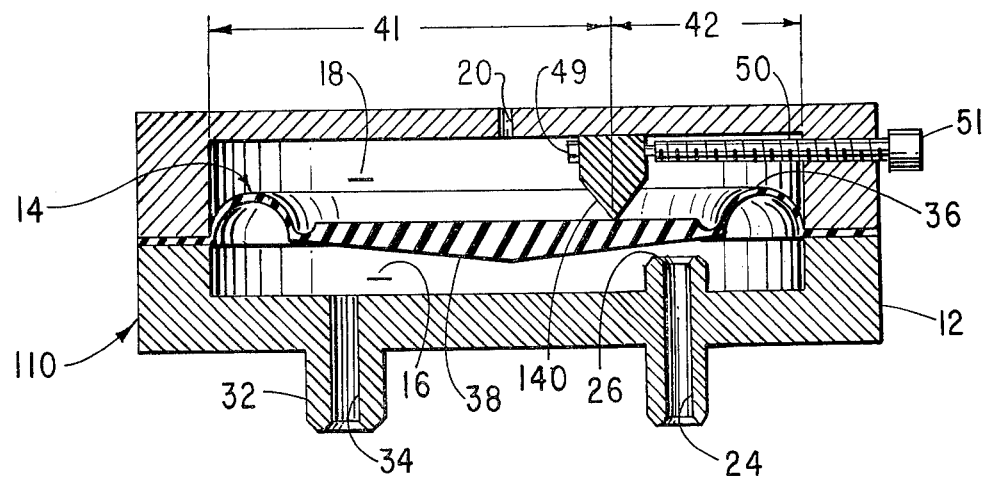
FIG. 5 is a vertical section of another embodiment of a pressure regulator according to the present invention.

Another embodiment of a pressure regulator according to the present invention is illustrated in FIG. 5 with parts identical to those of the embodiment of FIG. 1 being given identical reference numbers and not described again and similar parts being given the same reference numbers with 100 added. The primary difference between the embodiment of FIG. 5 and the embodiment of FIG. 1 is that the adjustment of regulation pressure is accomplished in the embodiment of FIG. 5 by movement of the position of the fulcrum on the diaphragm whereas such pressure adjustment is accomplished in the embodiment of FIG. 1 by adjustment of the force of spring 28 via inlet fitting 22.

In the pressure regulator 110 of FIG. 5, a fulcrum 140 defining control portion 41 and valve member operating portion 42 is carried on a rod 49 extending from a screw 50 threadedly engaging a side wall of casing 12 and carrying a knob 51 on its external end. Pressure regulating operation provided by control portion 41 and valve member operating portion 42 of the embodiment of FIG. 5 is the same as that described with respect to the embodiment of FIG. 1; however, in order to adjust the regulation pressure, the fulcrum 140 is moved by rotation of knob 51 along the diaphragm toward and away from the center to control the position at which the fulcrum engages the diaphragm thereby changing the effective surface areas of the control portion 41 and the valve member operating portion 42. The ratio of the areas of control portion 41 to valve member operating portion 42 is increased by movement of the fulcrum 140 away from the center of the diaphragm thereby decreasing the regulation pressure, and the ratio is decreased by movement of the fulcrum 140 toward the center of the diaphragm thereby increasing the regulation pressure. Accordingly, regulation pressure can be adjusted in the embodiment of FIG. 5 by merely turning knob 51 and without requiring the use of a coiled spring and its associated seating and sealing structure.

Figure 6:
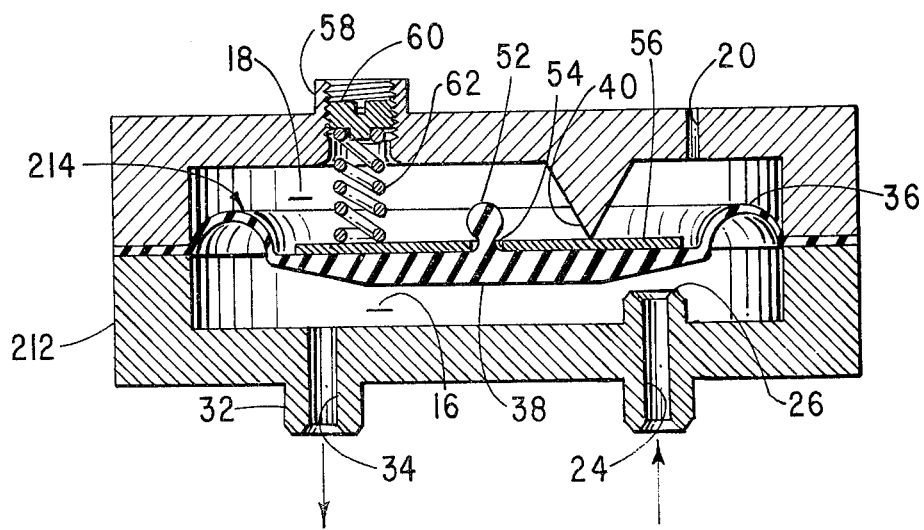
FIG. 6 is a vertical section of a further embodiment of a pressure regulator according to the present invention.

A further embodiment of a pressure regulator according to the present invention is illustrated in FIG. 6 with parts identical to parts of FIG. 1 being given identical reference numbers and similar parts being given the same reference numbers with 200 added. The primary difference between the embodiments of FIGS. 1 and 6 is that in the embodiment of FIG. 6, pressure regulation adjustment is accomplished by adjusting the compression of a spring in the atmospheric chamber 18 to eliminate the necessity of a pressure seal around the adjusting screw positioned in the pressure chamber as in FIG. 1.

In the embodiment of FIG. 6, the diaphragm 214 has a bulbous extension 52 extending through a central aperture 54 in a back-up plate 56 such that the thickened central portion 38 of the diaphragm 214 is carried by the plate 56. Casing 212 has an internally threaded extension 58 extending from the top wall thereof, and a pressure adjusting screw 60 threadedly engages extension 58. A coiled spring 62 is mounted in compression between pressure adjusting screw 60 and back-up plate 56. The operation of the embodiment of the pressure regulator 210 is the same as that previously described with respect to FIG. 1 with the exception that adjustment of screw 60 will effectively adjust the regulation pressure in the same manner as spring 28 in the embodiment of FIG. 1 to bias the diaphragm 214 in a counterclockwise direction.

Any of the various means for adjusting outlet pressure, such as the springs of FIGS. 1 and 6 and the movable fulcrum of FIG. 5, can be utilized with a diaphragm of any suitable configuration, such as the configurations illustrated in FIGS. 2, 3 and 4, in accordance with the present invention, it being essential only that the diaphragm be positioned in the casing to be exposed to pressure with the fulcrum positioned off-center to permit the diaphragm to pivot with lever action about the fulcrum. Movement of the valve member operating portion of the diaphragm will be less than movement of the control portion of the diaphragm with the valve operating force being determined by the spring in combination with the ratio of the areas of the control and valve member operating portions of the diaphragm in the embodiment of FIGS. 1 and 6 and by merely the ratio of the areas of the control and valve member operating portions in the embodiment of FIG. 5, the valve operating force being increased by the lever action of the diaphragm on the fulcrum. The valve member of the regulating valve 25 can be the valve member operating portion of the diaphragm, can be carried by the valve member operating portion or can be operated by movement of the valve member operating portion through any suitable linkage, and the regulating valve of the present invention can take the form of any structure operative to variably restrict flow, such structure not necessarily having an "off" or closed position. While the regulating valve is advantageously disposed at the inlet, the regulating valve can be disposed at any suitable position to control flow in the casing.

Inasmuch as the present invention is subject to many variations, modifications and changes in detail, it is intended that all matter described above or shown in the accompanying drawings be interpreted as illustrative and not in a limiting sense.

What is claimed is:

1. A pressure regulator comprising
   a casing having inlet means and outlet means;
   diaphragm means mounted in said casing to define a pressure chamber communicating with said inlet means and said outlet means;
   regulating valve means disposed in said casing and including a valve seat; and
   fulcrum means mounted at an off-center position in said casing and with an elongate edge engaging said diaphragm means to define a first control portion of said diaphragm means and a second valve member operating portion thereof, such that the first portion of said diaphragm means has a greater area exposed to pressure in said pressure chamber than the second portion thereof, said second portion of said diaphragm means being movable thereby to cooperate with said valve seat and control fluid flow in said casing whereby said diaphragm means pivots about said fulcrum means as pressure in said pressure chamber varies to move said second valve member operating portion relative to said valve seat and regulate pressure at said outlet means;
   said fulcrum means including means movable along and relative to said diaphragm means to change the ratio of the areas of said first and second portions and adjust the regulated pressure at said outlet means.

2. A pressure regulator comprising
   a casing having inlet means and outlet means,
   diaphragm means mounted in said casing to define a pressure chamber communicating with said inlet means and said outlet means,
   regulating valve means disposed in said casing including a valve seat and a valve member movable by said diaphragm means to cooperate with said valve seat and control flow in said casing,
   fulcrum means engaging said diaphragm means to define first and second portions of said diaphragm means having unequal areas exposed to pressure in said pressure chamber whereby said diaphragm means pivots about said fulcrum means as pressure in said pressure chamber varies to move said valve member relative to said valve seat and regulate pressure at said outlet means,
   said inlet means with a fitting mounted on said casing and having an internal end defining said valve seat of said regulating valve means, said second portion of said diaphragm means having an area less than said first portion and being aligned with said valve seat to define said valve member of said regulating valve means, and
   further comprising spring means mounted in compression between said second portion of said diaphragm means and said fitting, said fitting threadedly engaging said casing to permit adjustment of the compression of said spring means to adjust the regulated pressure at said outlet means.

3. A pressure regulator as recited in claim 2 wherein said diaphragm means defines an atmospheric chamber in said casing on a side opposite said pressure chamber, and said casing has a vent to the atmosphere communicating with said atmospheric chamber.

4. A pressure regulator comprising
   a casing having inlet means and outlet means;
   diaphragm means mounted in said casing to define a pressure chamber communicating with said inlet means and said outlet means;
   regulating valve means disposed in said casing including a valve seat; and
   fulcrum means mounted at an off-center position in said casing and with an elongate edge engaging said diaphragm means to define a first control portion of said diaphragm means and a second valve member operating portion thereof, such that the first portion of said diaphragm means has a greater area exposed to pressure in said pressure chamber than the second portion thereof, said second portion of said diaphragm means being movable thereby to cooperate with said valve seat and control fluid flow in said casing whereby said diaphragm means pivots about said fulcrum means as pressure in said pressure chamber varies to move said second valve member operating portion relative to said valve seat and regulate pressure at said outlet means;
   said diaphragm means including a thickened central portion comprised of said first and second portions and said diaphragm means further including a flexing rib.

5. A pressure regulator as recited in claim 4 and further comprising means for moving said fulcrum means along and relative to said diaphragm means to change the ratio of the areas of said first and second portions and adjust the regulated pressure at said inlet means.

6. A pressure regulator comprising
   a casing having inlet means and outlet means,
   diaphragm means mounted in said casing to define a pressure chamber communicating with said inlet means and said outlet means,
   regulating valve means disposed in said casing including a valve seat and a valve member movable by said diaphragm means to cooperate with said valve seat and control flow in said casing, fulcrum means engaging said diaphragm means to define first and second portions of said diaphragm means having unequal areas exposed to pressure in said pressure chamber whereby said diaphragm means pivots about said fulcrum means as pressure in said pressure chamber varies to move said valve member relative to said valve seat and regulate pressure at said outlet means, said inlet means defining said valve seat of said regulating valve means and said second portion of said diaphragm means being aligned with said inlet means to define said valve member, said first portion of said diaphragm means having an area greater than the area of said second portion of said diaphragm means, means for moving said fulcrum means along said diaphragm means to change the ratio of the areas of said first and second portions and adjust the regulated pressure at said inlet means, and said fulcrum moving means including a screw extending through said casing and rotatable to adjust the position of said fulcrum means along said diaphragm means.

7. A pressure regulator as recited in claim 6 wherein said diaphragm means defines an atmospheric chamber in said casing on a side opposite said pressure chamber, and said casing has a vent to the atmosphere communicating with said atmospheric chamber.

* * * * *